US009010626B2

(12) United States Patent
Kanagawa et al.

(10) Patent No.: US 9,010,626 B2
(45) Date of Patent: Apr. 21, 2015

(54) PAPER MONEY RECEIVING/DISPENSING MECHANISM AND AUTOMATIC TELLER MACHINE

(75) Inventors: Takeshi Kanagawa, Owariasahi (JP); Riichi Kato, Nagoya (JP); Shinji Shibata, Nagoya (JP); Junji Fujita, Nagoya (JP); Minoru Kadowaki, Toyota (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 619 days.

(21) Appl. No.: 12/262,354

(22) Filed: Oct. 31, 2008

(65) Prior Publication Data

US 2009/0118861 A1 May 7, 2009

(30) Foreign Application Priority Data

Nov. 2, 2007 (JP) ................................ 2007-286398

(51) Int. Cl.
*G06Q 40/00* (2012.01)
*G07F 19/00* (2006.01)

(52) U.S. Cl.
CPC .............. *G07F 19/203* (2013.01); *G07F 19/20* (2013.01)

(58) Field of Classification Search
USPC .......................................... 235/379; 700/231
See application file for complete search history.

(56) References Cited

U.S. PATENT DOCUMENTS

2002/0074709 A1* 6/2002 Kanagawa .................. 271/3.14
2003/0094402 A1 5/2003 Seo et al.
2005/0056693 A1* 3/2005 Yokoi et al. .................. 235/379

FOREIGN PATENT DOCUMENTS

EP 1 209 633 5/2002
EP 1 517 275 3/2005
EP 1 603 085 12/2005
EP 1 686 545 8/2006
JP 60-254396 12/1985
JP 61-221894 10/1986
JP 01-114998 5/1989
JP 03-192049 8/1991
JP 2000-331214 11/2000
JP 2001-022998 1/2001
JP 2003-157461 A 5/2003

OTHER PUBLICATIONS

Chinese Office Action No. 200810170431.7) dated Mar. 1, 2010.
Notification of Reasons for Rejection (JP2007-286398) dated May 24, 2012.

* cited by examiner

*Primary Examiner* — Rafferty Kelly
(74) *Attorney, Agent, or Firm* — Baker Botts L.L.P.

(57) ABSTRACT

A paper money receiving/dispensing mechanism comprises a paper money storage unit that temporarily stores paper money; a paper money receiving/dispensing opening, arranged above the storage unit, used for receiving and dispensing paper money; a paper money transport unit capable of switching to either one of an operating position for transporting paper money between the storage unit and the paper money receiving/dispensing opening and a standby position; and a transport control unit for switching the paper money transport unit to the operating position or the standby position.

16 Claims, 10 Drawing Sheets

PAPER MONEY RECEIVING/DISPENSING MECHANISM AND AUTOMATIC TELLER MACHINE

CROSS REFERENCE TO RELATED APPLICATIONS

The present invention claims priority from Japanese Application No. 2007-286398 filed on Nov. 2, 2007, the content of which is hereby incorporated by reference into this application.

BACKGROUND OF THE INVENTION

The present invention relates to a paper money receiving/dispensing mechanism for an automatic teller machine.

Some conventional paper money receiving/dispensing mechanisms for automatic teller machines have a paper money input slot through which paper money is horizontally input by a customer, and a transport device for transporting the input paper money into the inside of the mechanism. Other mechanisms have a paper money input/output opening and a temporary storage chamber inside the opening, where the customer directly inputs paper moneys into the chamber through the input/output opening, and takes out paper moneys from the chamber through the input/output opening.

However, with the mechanisms having the paper money input slot, there are cases when if the customer inputs paper money with misaligned orientation, the money causes skewing or jamming. With the mechanisms having the opening and the temporary storage chamber, it is necessary for the customer to put his or her fingers inside the opening when paper money is being received/dispensed. Some customers do not wish to put their fingers inside the opening and others would like to put their fingers in the opening because they can actually sense that the paper moneys are securely being input. Accordingly, there is a need for a paper money receiving/dispensing mechanism that is able to cope with the preferences of various customers.

SUMMARY OF THE INVENTION

An object of the present invention is to suppress paper money skewing and jamming and to cope with operation preferences of various customers.

An aspect of the present invention is a paper money receiving/dispensing mechanism. The mechanism comprises a paper money storage unit that temporarily stores paper money; a paper money receiving/dispensing opening, arranged above the storage unit, used for receiving and dispensing paper money; a paper money transport unit capable of switching to either one of an operating position for transporting paper money between the storage unit and the paper money receiving/dispensing opening and a standby position; and a transport control unit for switching the paper money transport unit to the operating position or the standby position. With this mechanism, the paper money receiving/dispensing opening is arranged above the storage unit, so when paper money is inserted into the paper money receiving/dispensing opening, it is easy to align paper money using gravity, whereby skewing and jamming do not occur easily. By switching the position of the paper money transport unit to the standby position or the operating position, it is possible to respond to the operating wishes of various customers.

The mechanism may further comprises a paper money stopping unit capable of switching to either one of a stopping position for stopping the paper money between the storage unit and the paper money receiving/dispensing opening or a standby position; and a stopping control unit that switches the paper money stopping unit to the stopping position or the standby position. With this mechanism, by switching the position of the paper money stopping unit to the standby position or the stopping position, it is possible to respond to the operating wishes of various customers.

With the mechanism, it is also possible to have it so that during receiving of the paper money, the transport control unit switches the paper money transport unit to the operating position; and the stopping control unit switches the paper money stopping unit to the standby position. With this mechanism, it is possible to transport the deposited paper money from the paper money receiving/dispensing opening to the storage unit by the paper money transport units, so it is possible to give the customer the actual sense of the paper money being taken in.

With the mechanism, it is also possible to have it so that during receiving of the paper money, the stopping control unit switches the paper money stopping unit to the stopping position; and in a state with the paper money stopping unit switched to the stopping position, the transport control unit switches the paper money transport unit to the operating position. With this mechanism, the deposited paper money is stopped once by the paper money stopping unit, and is taken in thereafter. Therefore, it is also possible to respond to customers who do not wish to put their fingers inside the paper money receiving/dispensing money slot.

With the mechanism, it is also possible to have it so that during dispensing of the paper money, the stopping control unit switches the paper money stopping unit to the standby position; and the transport control unit switches the paper money transport unit to the operating position. With this mechanism, the dispensed paper money is transported by the paper money transport unit to the paper money receiving/dispensing opening, so it is possible to respond to customers who do not wish to put their fingers inside the paper money receiving/dispensing money slot.

With the mechanism, it is also possible to have it so that during receiving of the paper money, the transport control unit switches the paper money transport unit to the operating position. With this mechanism, it is possible to have the deposited paper money transported by the paper money transport unit from the paper money receiving/dispensing opening to the storage unit. It is possible to give the customer a real sense of the paper money being taken in.

Another aspect of the present invention is a paper money receiving/dispensing mechanism. The mechanism comprises a paper money storage unit that temporarily stores paper money; a paper money receiving/dispensing opening, arranged above the storage unit, used for receiving and dispensing paper money; a paper money stopping unit capable of switching to either one of a stopping position for stopping the paper money between the storage unit and the paper money receiving/dispensing opening and a standby position; and a stopping control unit for switching the paper money stopping unit to the standby position or the stopping position. With this mechanism, the deposited paper money is stopped once by the paper money stopping unit, and is taken in thereafter. Therefore, it is possible to respond to customers who do not wish to put their fingers inside the paper money receiving/dispensing money slot.

Still another aspect of the present invention is an automatic teller machine, comprising a paper money receiving/dispensing mechanism according to the aspect noted above. The aspect of the present invention is not limited to paper money receiving/dispensing mechanism, and can also be an automatic teller machine.

BRIEF DESCRIPTION OF THE DRAWINGS

Preferred embodiments of the present invention will be described in conjunction with the accompanying drawings, in which.

DESCRIPTION OF THE PREFERRED EMBODIMENTS

Figure 1:
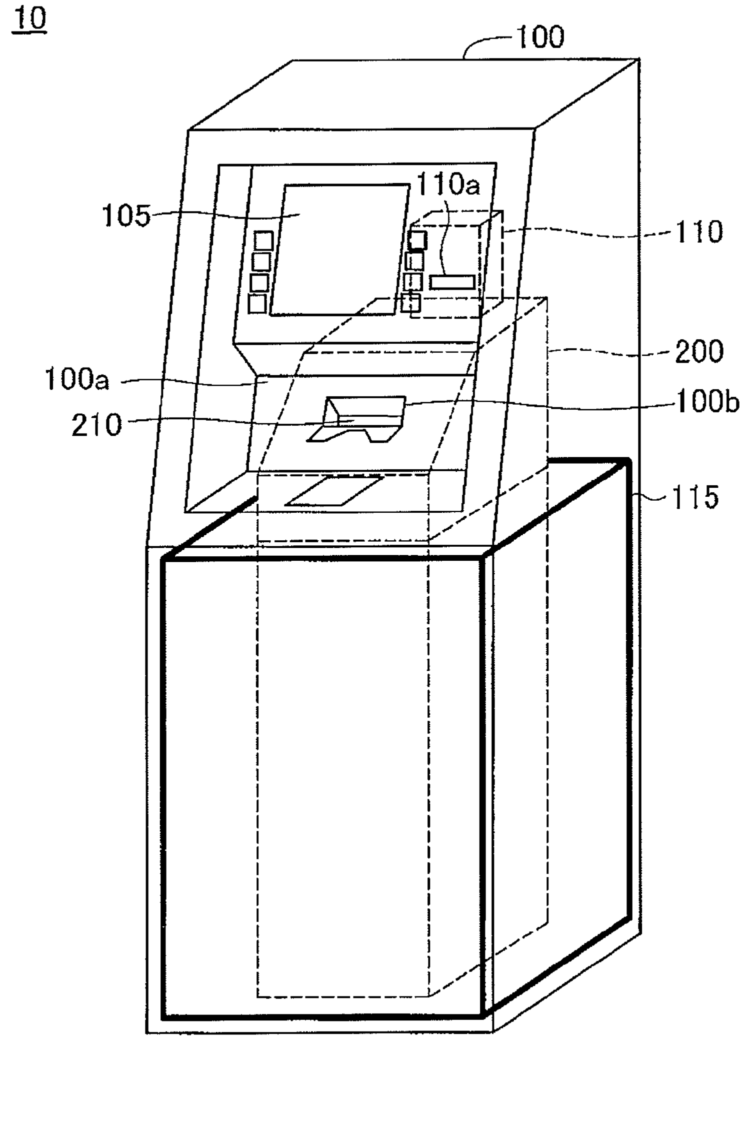
FIG. 1 is an explanatory drawing typically showing the external appearance of the ATM of this embodiment.
Figure 2:
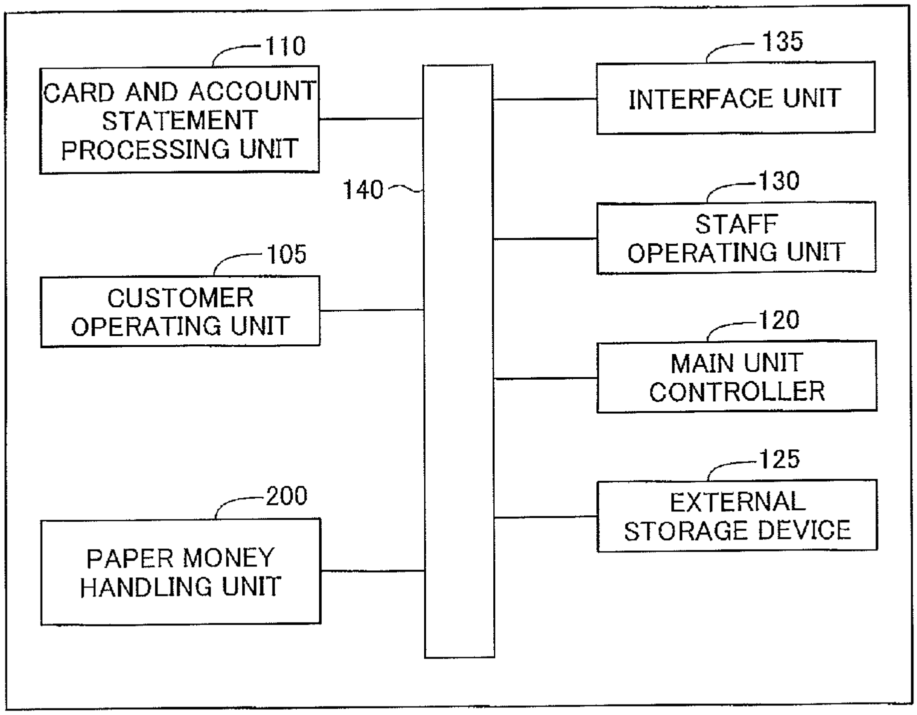
FIG. 2 is an explanatory drawing typically showing the constitution of the ATM control block of this embodiment.

Using FIG. 1 and FIG. 2, we will describe the constitution of the automatic teller machine (hereafter called "ATM") of this embodiment. FIG. 1 is an explanatory drawing typically showing the external appearance of the ATM of this embodiment. FIG. 2 is an explanatory drawing typically showing the constitution of the ATM control block of this embodiment. The ATM 10 has a housing 100, a customer operating unit 105, a card and account statement processing unit 110, a cashbox 115, a main unit controller 120, a data storage unit 125, a staff operating unit 130, an interface unit 135, an internal bus 140, and a paper money handling unit 200.

The housing 100 is a box-shaped container that constitutes the outer wall of the ATM 10. A front panel 100*a* is arranged on the front surface of the housing 100. On the top left side of the front panel 100*a* is arranged the customer operating panel 105. The customer operating unit 105 is an input and display device that accepts operations from the customer and displays the transaction contents. With this embodiment, as the customer operating unit 105, a touch panel capable of displaying the operating screen and the transaction contents is used. At the upper right side of the front panel 100*a* is arranged the card and account statement processing unit 110. The card and account statement processing unit 110 reads, for example, verification data used for verification or transaction data from the user, writes the transaction data to the card, and prints a transaction statement. The card and account statement processing unit 110 has a card slot 110*a* for inserting the customer card.

Inside the housing 100 is arranged the paper money handling unit 200 which performs paper money receiving/dispensing processing. The bottom of the paper money handling unit 200 is surrounded by a cashbox 115. The cashbox 115 is a box surrounded, for example, by a metal plate that is several tens of millimeters thick. The cashbox 115 is protected so as to prevent theft of paper money stored in the storage box installed under the paper money handling unit 200.

A paper money receiving/dispensing slot 100*b* is provided at approximately the center of the front panel 100*a*. A paper money receiving/dispensing mechanism 210 is arranged inside the ATM 10 with the paper money receiving/dispensing slot 100*b*. Note that the paper money receiving/dispensing mechanism 210 forms part of the constitution of the paper money handling unit 200.

The main unit controller 120 controls the overall operation of the ATM 10, and processes the data handled by the ATM 10. The storage unit 125 stores data processed by the main unit controller 120. The staff operating unit 130 is an operating panel for the banking facility staff member to perform operations when performing, for example, ATM 10 maintenance, or paper money filling or collecting. The interface unit 135 connects the ATM 10 to a network (not illustrated), and relays the exchange of information between the ATM 10 and the network. The internal bus 140 is a data transmission line connected to the customer operating unit 105, the card and account statement processing unit 110, the cashbox 115, the main unit controller 120, the storage unit 125, the staff operating unit 130, and the interface unit 135.

Figure 3:
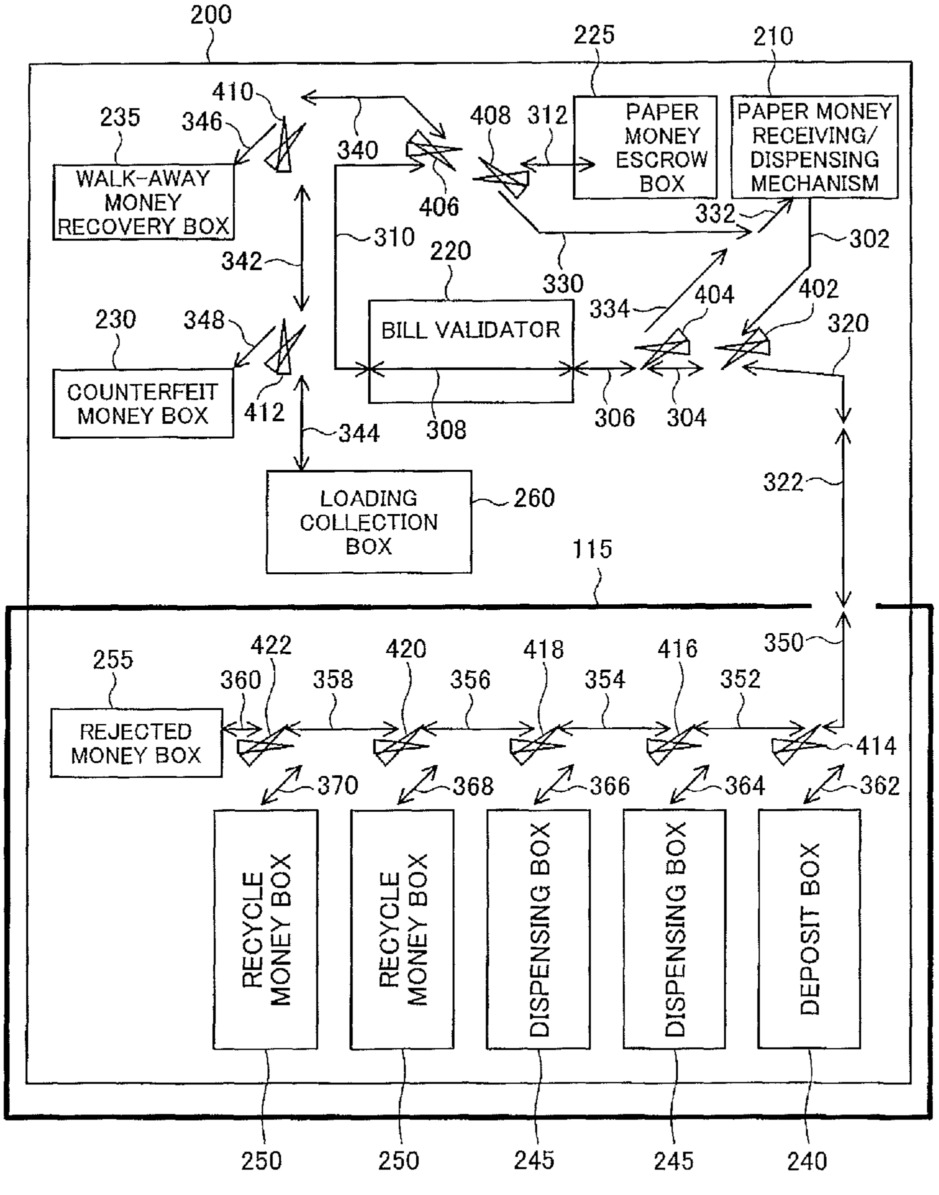
FIG. 3 is an explanatory drawing typically showing the constitution of the paper money handling unit.

We will use FIG. 3 to describe the constitution of the paper money handling unit 200. FIG. 3 is an explanatory drawing typically showing the constitution of the paper money handling unit 200. The paper money handling unit 200 has a paper money receiving/dispensing mechanism 210, a bill validator 220, a paper money escrow box 225, a counterfeit money box 230, a walk-away money recovery box 235, a deposit box 240, a dispensing box 245, a recycle money box 250, a rejected money box 255, and a loading collection box 260, which are linked via paper money transport paths 302 to 370 and switching gates 402 to 422. Here, the paper money transport paths 302 to 370 are used for transporting paper moneys. Paper money transport devices (not illustrated) such as rollers, and belts, for example, are arranged in the paper money transport paths 302 to 370. Also, the switching gates 402 to 422 are switching points for paths.

The paper money receiving/dispensing mechanism 210 is arranged at the top front of the paper money handling unit 200 inside the ATM 10. The paper money receiving/dispensing mechanism 210 takes the deposited paper moneys, and dispenses paper moneys from the paper money receiving/dispensing slot 100*b*. The paper money receiving/dispensing mechanism 210 is a characteristic part of this embodiment. The constitution of the paper money receiving/dispensing mechanism 210 will be described later.

The bill validator 220 is connected to the paper money receiving/dispensing mechanism 210 via the paper money transport path 302, the switching gate 402, the paper money transport path 304, the switching gate 404, and the paper money transport path 306. Inside the bill validator 220 is arranged the paper money transport path 308. The bill validator 220 fetches the image of the paper money, verifies this image data with the paper money image data stored in advance in the storage unit 125, and makes a determination of the authenticity and the face value of the paper money. Note that the bill validator 220 can also be constituted so that it fetches the image data of the transported paper money and sends it to the main unit controller 120, and the main unit controller 120 verifies that image data with the paper money image data stored in advance in the storage unit 125, and performs determination of the paper money authenticity and face value.

The paper money escrow box 225, the counterfeit money box 230, the walk-away money recovery box 235, and the loading collection box 260 are paper money storage boxes arranged outside the cashbox 115. The deposit box 240, the dispensing box 245, the recycle money box 250, and the rejected money box 255 are paper money storage boxes arranged inside the cashbox 115.

The paper money escrow box 225 is connected to the bill validator 220 via the paper money transport path 310, the switching gates 406 and 408, and the paper money transport path 312. The paper money escrow box 225 temporarily stores the paper money validated by the bill validator 220, for example. Note that the paper money transport paths 330 and 332 are connected to the switching gate 408, and the paper money transport path 332 is connected to the paper money receiving/dispensing mechanism 210. The dispensed paper bills from the storage box inside the cashbox 115 are transported to the paper money receiving/dispensing mechanism 210 through the bill validator 220 and the paper money transport paths 330 and 332. The paper money transport path 334 is connected to the switching gate 404, and the paper money transport path 334 is connected to the paper money transport path 330. The paper money stored in the paper money escrow box 225 is transported to the paper money receiving/dispensing mechanism 210 through the bill validator 220 and the paper money transport path 334.

The counterfeit money box 230 is connected to the switching gate 406 via the paper money transport path 340, the switching gate 410, the paper money transport path 342, the switching gate 412, and the paper money transport path 348. The counterfeit money box 230 stores the paper money determined to be counterfeit by the bill validator 220.

The walk-away money recovery box 235 is connected to the switching gate 410 via the paper money transport path 346. The walk-away money recovery box 235 stores paper moneys forgotten by the customer in the paper money receiving/dispensing mechanism 210 when dispensing money or when refunding money, for example.

The deposit box 240 is connected to the switching gate 402 via the paper money transport paths 320, 322, and 350, the switching gate 414, and the paper money transport path 362. Of the paper money deposited to the ATM 10, the deposit box 240 stores paper moneys of the face value not used for dispensing money.

The dispensing box 245 is connected to the switching gate 414 via the paper money transport path 352, the switching gate 416, the paper money transport path 354, the switching gate 418, the paper money transport path 364, and the paper money transport path 366. The dispensing box 245 stores the paper money to be dispensed from the ATM 10.

The recycle money box 250 is connected to the switching gate 418 via the paper money transport path 356, the switching gate 420, the paper money transport path 358, the switching gate 422, the paper money transport path 368, and the paper money transport path 370. Of the deposited paper money, the recycle money box 250 stores the paper moneys of the face value used for dispensing money.

The rejected money box 255 is connected to the switching gate 422 via the paper money transport path 360. The rejected money box 255 stores paper moneys determined to be unsuitable for market distribution due to damage. Note that the judgment of paper money damage is performed by the bill validator 220, for example.

The loading collection box 260 is connected to the switching gate 412 via the paper money transport path 344. Paper moneys for filling are set in the loading collection box 260. The paper moneys collected from the deposit box 240, the recycle money box 250, or the rejected money box 255 may be gathered in the collection box 260. The banking facility staff member sets the paper moneys for filling in the loading collection box 260, operates the staff operating unit 130, and sends them to the dispensing money box 245 or the recycle money box 250. The banking facility staff member operates the staff operating unit 130 and collects paper moneys stored in the deposit box 240, the recycle money box 250, or the rejected money box 255. The banking facility staff member is able to fill and collect paper moneys without opening the cashbox 115, and so it is possible to increase the safety when filling and collecting paper moneys.

Figure 4:
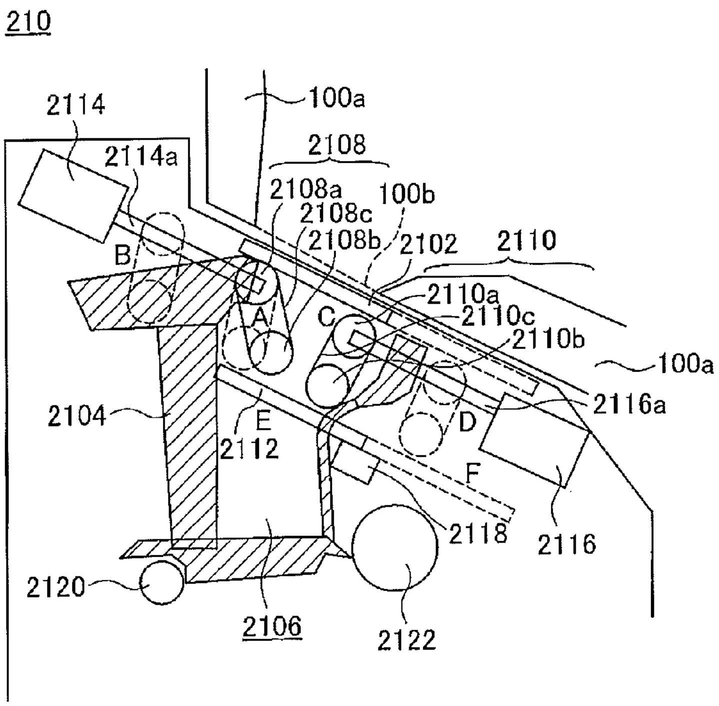
FIG. 4 is an explanatory drawing typically showing the constitution of the paper money receiving/dispensing mechanism.

We will describe the constitution of the paper money receiving/dispensing mechanism 210 using FIG. 4. FIG. 4 is an explanatory drawing typically showing the constitution of the paper money receiving/dispensing mechanism 210. The paper money receiving/dispensing mechanism 210 is arranged adjacent in the vertical direction of the paper money receiving/dispensing slot 100*b* formed on the front panel 100*a*. The paper money receiving/dispensing mechanism 210 has a shutter 2102, an inner wall 2104, a paper money temporary retention unit 2106, a first paper money transport device 2108, a second paper money transport device 2110, a paper money stopper 2112, a first movement device 2114, a second movement device 2116, a paper money stopper movement device 2118, a stack roller 2120, and a paper money separating roller 2122.

The shutter 2102 is a door that opens and closes by sliding, provided on the inside of the paper money receiving/dispensing slot 100*b*. The shutter 2102 prevents infiltration of rain, dust, foreign matter or the like inside the paper money receiving/dispensing mechanism 210. Note that when the ATM 10 is installed indoors it is not easily affected by the environment, the paper money receiving/dispensing mechanism 210 does not have to be equipped with the shutter 2102. On the other hand, when the ATM 10 is installed in a location easily affected by the outside environment, the ATM 10 may also have a double shutter constitution equipped with a shutter also at the paper money receiving/dispensing slot 100*b*.

The paper money temporary retention unit 2106 is a storage box for temporarily retaining deposited paper money or dispensing paper money, arranged underneath the paper money receiving/dispensing slot 100*b*. The side surface and bottom of the paper money temporary retention unit 2106 are formed by the inner wall 2104. The bottom of the paper money temporary retention unit 2106 is flat so as to be able to align the deposited paper money and the dispensing paper money.

The first paper money transport device 2108 and the second paper money transport device 2110 are arranged facing opposite on the side surface top of the paper money temporary retention unit 2106. The first paper money transport device 2108 has rollers 2108*a* and 2108*b* and a belt 2108*c*. The second paper money transport device 2110 has rollers 2110*a* and 2110*b* and a belt 2110*c*. The distance between the roller 2108*b*, the roller 2110*b*, and the paper money receiving/dispensing slot 100*b* is shorter than the length of the paper money in the insertion direction. The belt 2108*c* is placed on the rollers 2108*a* and 2108*b*. The belt 2110*c* is placed on the roller 2110*a* and 2110*b*.

The first moving device 2114 has an expandable/contractible axis 2114*a*, and the roller 2108*a* of the first paper money transport device 2108 is connected to the tip part of the axis

2114*a*. The first moving device 2114 is able to move the roller 2108*a* by expanding/contracting the axis 2114*a*. Therefore, the first moving device 2114 is able to move the first paper money transport device 2108 including the roller 2108*a*. For example, the first moving device 2114, when transporting the paper money, expands axis 2114*a* and advances the first paper money transport device 2108 to the operating position A, and when not transporting the paper money, contracts the axis 2114*a* and draws back the first paper money transport device 2108 to the standby position B. Note that with this embodiment, the constitution has the roller 2108*a* connected to the tip of the axis 2114*a*, but for example, it is also possible to have a constitution for which an axis that links the two rollers 2108*a* and 2108*b* are connected to the tip of the axis 2114*a*. The second moving device 2116 also has the same constitution, and moves the second paper money transport device 2110 between the operating position C and the standby position D.

When the first paper money transport device 2108 is positioned at the operating position A, the roller 2108*b* is pushed in the direction of the second paper money transport device 2110. Note that it is also possible, when the second paper money transport device 2110 is positioned at the operating position C, to have the roller 2110*b* pushed in the direction of the first paper money transport device 2108. As a pushing unit, for example, it is possible to use a spring, motor, or the like. By pushing the roller 2108*b*, if the thickness the paper moneys are of the allowed sheet count or less, it is possible to grip the paper moneys regardless of the number of sheets of paper money. Note that with this embodiment, the constitution is such that the roller 2108*b* is pushed, but conversely, it is also possible to have the constitution such that only the roller 2110*b* is pushed.

Note that the gap between the rollers 2108*b* and 2110*b* is narrower than the gap between the rollers 2108*a* and 2110*a*, and the first paper money transport device 2108 and the second paper money transport device 2110 have a V-shape. Specifically, the paper money receiving/dispensing slot 100*b* side is broader, so when depositing, it is possible to easily insert paper money between the first paper money transport device 2108 and the second paper money transport device 2110.

The first paper money transport device 2108 rotates the roller 2108*b* clockwise, and the second paper money transport device 2110 rotates the roller 2110*b* counterclockwise, whereby, the belts 2108*c* and 2110*c* are respectively rotated clockwise and counterclockwise, and the deposited paper moneys are transported from the paper money receiving/dispensing slot 100*b* to the paper money temporary retention unit 2106 and taken in. On the other hand, the first paper money transport device 2108 rotates the roller 2108*b* counterclockwise, and the second paper money transport device 2110 rotates the roller 2110*b* clockwise, whereby, the belts 2108*c* and 2110*c* are respectively rotated counterclockwise and clockwise, and the dispensing paper moneys are transported from the paper money temporary retention unit 2106 to the paper money receiving/dispensing slot 100*b*. Note that with this embodiment, the rollers 2108*b* and 2110*b* are rotated, but it is also possible to rotate the rollers 2108*a* and 2110*a*.

The paper money stopper 2112 is arranged at a position whose distance from the paper money in the receiving/dispensing slot 100*b* is shorter than the length of the paper money in the receiving/dispensing direction. The paper money stopper moving device 2118 moves the paper money stopper 2112 between the stopping position E and the standby position F. When the paper money stopper 2112 is at the stopping position E, the paper money is inserted from the paper money receiving/dispensing slot 100*b*, and is stopped midway of insertion of the paper money in a state with part of the paper money appearing from the paper money receiving/dispensing slot 100*b*. Therefore, when the paper money stopper 2112 is at the stopping position E, in a state for which part of the deposited paper money appears from the paper money receiving/dispensing slot 100*b*, the paper money is stopped by the paper money stopper 2112, so it is possible to cope with operation preferences of customers who do not wish to put their fingers through the paper money receiving/dispensing slot 100*b*.

The stack roller 2120, when dispensing money or refunding money, sends paper money transported from the paper money transport path 332 to the paper money temporary retention unit 2106. The paper money separation roller 2122, when depositing money, separates to one sheet each the paper money retained in the paper money temporary retention unit 2106 and sends this out to the paper money transport unit 302.

Following, we will give a brief description of the operation of the ATM 10 of this embodiment. Note that the operation within the paper money receiving/dispensing mechanism 210 will be described later.

When depositing money, the paper moneys input to the paper money receiving/dispensing mechanism 210 are sent out one sheet each to the paper money transport path 302. The paper money is transported to the bill validator 220 through the paper money transport paths 302 to 306, and the authenticity and face value is determined at the bill validator 220. The determination results are sent to the main unit controller 120 and stored in the storage unit 125. Meanwhile, the paper money is transported to the paper money escrow box 225 and stored in sequence. Note that an item that is not paper money such as a receipt, or even if it is paper money, an item that was slanted so was not recognized, is transported to the paper money receiving/dispensing mechanism 210 and returned to the customer.

When a transaction is established, the paper money is sent out one sheet at a time from the paper money escrow box 225 in the reverse order of the sequence in which they were stored. After the face value is reconfirmed after passing through the bill validator 220, the paper money is stored in one of the deposit box 240, the recycle money box 250, or the rejected money box 255. When the paper money is counterfeit, the paper money is stored in the counterfeit money box 230. When refunding paper money to the customer, the paper money is transported to the paper money receiving/dispensing mechanism 210, and refunded to the customer.

When dispensing money, the paper money is sent out from the dispensing box 245 and the recycle money box 250, and the paper money is transported to the bill validator 220. After the face value of the paper money is confirmed by the bill validator 220, it is transported to the paper money receiving/dispensing mechanism 210 and dispensed to the customer.

When filling paper money in the ATM 10, the banking facility staff member sets the paper money in the loading collection box 260. The set paper money, after its face value is determined by the paper money determination unit 220, is stored in either the dispensing box 245 or the recycle money box 250. When the banking facility staff member fills paper money directly in the dispensing box 245 and the recycle money box 250, there is the risk that the wrong face value will be set by mistake, but with this embodiment, because the face value of the paper money is determined by the ATM 10 itself, and the dispensing box 245 and the recycle money box 250 are separated, the paper money will not be stored in the wrong dispensing box 245 or recycle money box 250.

When the deposit box 240, the recycle money box 250, and the rejected money box 255 become full, the banking facility staff member stores the paper money in the loading collection box 260 by operating the staff operating unit 130.

Following, we will describe the paper money receiving/dispensing mechanism 210 using several modes as examples.

First Receiving Mode

Figure 5:
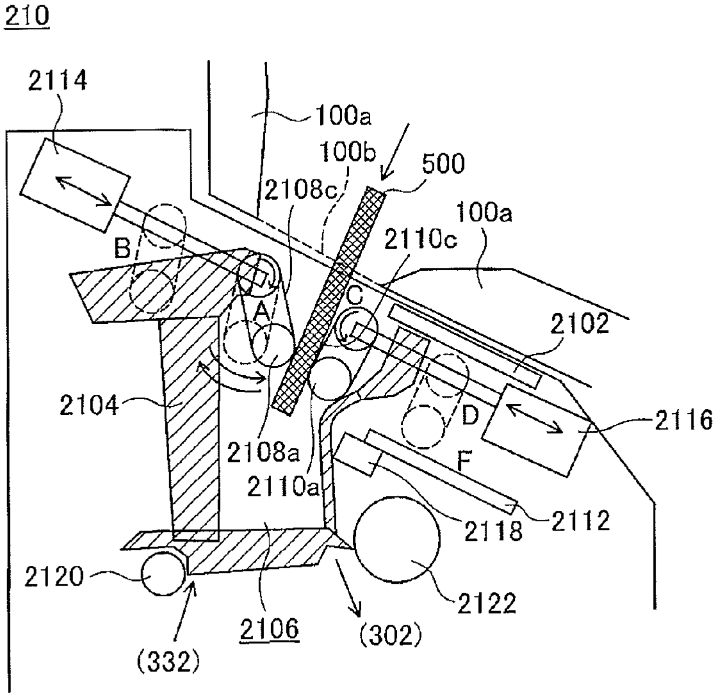
FIG. 5 is an explanatory drawing typically showing the first receiving mode.
Figure 6:
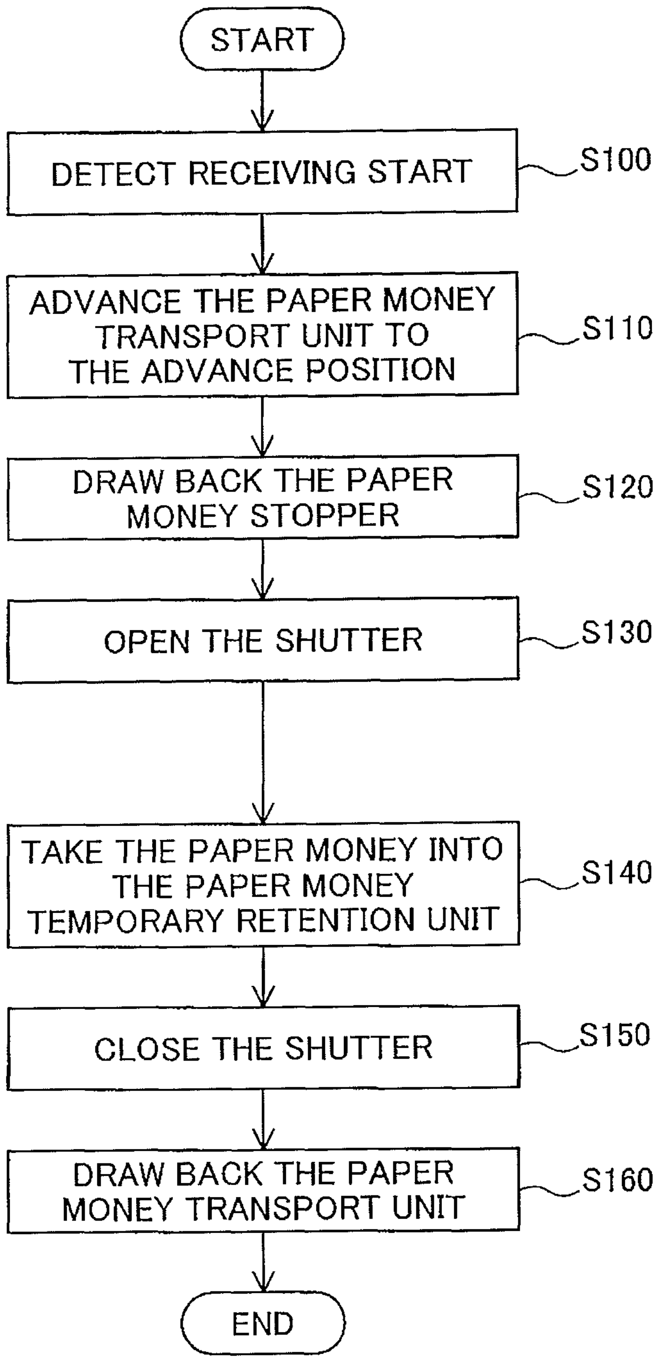
FIG. 6 is an explanatory drawing showing the operation flow chart of the first receiving mode.

We will describe the first receiving mode using FIG. 5 and FIG. 6. FIG. 5 is an explanatory drawing typically showing the first receiving mode. FIG. 6 is an explanatory drawing showing the operation flow chart of the first receiving mode. With the first receiving mode, the paper money receiving/dispensing mechanism 210, during depositing, advances the first paper money transport device 2108 to the operating position A, advances the second paper money transport device 2110 to the operating position C, and in a state with the paper money stopper 2112 drawn back to the standby position F, accepts insertion of the paper money, and using the first paper money transport device 2108 and the second paper money transport device 2110, takes in the paper money into the paper money temporary retention unit 2106.

When the customer performs the depositing operation on the customer operating unit 105, the main unit controller 120 detects the receiving start (step S100). The main unit controller 120 causes the first movement device 2114 to advance the first paper money transport device 2108 to the operating position A, and causes the second movement device 2116 to advance the second paper money transport device 2110 to the operating position C (step S110). The main unit controller 120 causes the roller 2108*b* of the first paper money transport device 2108 to turn in the counterclockwise direction around the roller 2108*a*. Note that the main unit controller 120 may also cause the roller 2110*b* of the second paper money transport device 2110 to turn in the clockwise direction around the roller 2110*a*. The first paper money transport device 2108 and the second paper money transport device 2110 have a V-shape, where the gripping gap of the shutter 2102 side becomes broader, and the gripping gap of the paper money temporary retention unit 2106 side becomes narrower. The main unit controller 120 rotates the roller 2108*b* of the first paper money transport device 2108 in the clockwise direction, and rotates the roller 2110*b* of the second paper money transport device 2110 in the counterclockwise direction on the drawing shown in FIG. 5.

The main unit controller 120 draws back the paper money stopper 2112 to the standby position F (step S120). Note that when the paper money stopper 2112 is already drawn back to the standby position F, this operation is unnecessary. The main unit controller 120 opens the shutter 2102 (step S130) and stands by for input of the paper money from the customer.

When the paper money is inserted, the first paper money transport device 2108 and the second paper money transport device 2110 grip the paper money, and take in the paper money to the paper money temporary retention unit 2106 (step S140). At this time, the distance between the roller 2108*b*, the roller 2110*b*, and the paper money receiving/dispensing slot 100*b* is shorter than the length of the paper money in the insertion direction, so the first paper money transport device 2108 and the second paper money transport device 2110 grip the paper money in a state with part of the paper money appearing from the paper money receiving/dispensing slot 100*b*. The paper money temporary retention unit 2106 has a flat bottom, and the paper money taken into the paper money temporary retention unit 2106 is aligned.

When the paper money intake is completed, the main unit controller 120 closes the shutter 2102 (step S150), stops the rotation of the roller 2108*b* of the first paper money transport device 2108 and the roller 2110*b* of the second paper money transport device 2110, and draws back the first paper money transport device 2108 and the second paper money transport device 2110 respectively to the standby position B and the standby position D (step S160).

According to the first receiving mode, the paper money receiving/dispensing mechanism 210 takes in the paper money in a vertical direction from the paper money receiving/dispensing slot 100*b*, and aligns it at the bottom of the paper money temporary retention unit 2106. The paper money is sent out one sheet at a time after that to the paper money transport path 302, but because the paper money is aligned, skewing does not occur easily, and jamming does not occur easily, either.

According to the first receiving mode, the paper money receiving/dispensing mechanism 210 has the paper money gripped by the first paper money transport device 2108 and the second paper money transport device 2110 in a state with part of it appearing from the paper money receiving/dispensing slot 100*b*, and takes the paper money into the paper money temporary retention unit 2106. As a result, the customer does not have to put his fingers inside the paper money receiving/dispensing slot 100*b* when inputting paper money to the paper money receiving/dispensing slot 100*b*. Therefore, it is possible to cope with the customer's operation preference of not wanting to put his fingers inside the paper money receiving/dispensing slot 100*b*.

According to the first receiving mode, the paper money receiving/dispensing mechanism 210 has the paper money gripped by the first paper money transport device 2108 and the second paper money transport device 2110 in a state with part of the paper money appearing from the paper money receiving/dispensing slot 100*b*, and takes in the paper money to the paper money temporary retention unit 2106, so it is possible to give the customer a real sense of the paper money being taken in and give a sense of security.

According to the first receiving mode, the paper money stopper 2112 is not advanced to the stopping position E. Therefore, with the constitution of the paper money receiving/dispensing mechanism 210 of the first receiving mode, it is also possible to have a constitution for which the paper money stopper 2112 and the paper stopper moving device 2118 are not provided. Note that in this case, step S120 in the flow chart shown in FIG. 6 is not necessary.

Second Receiving Mode

Figure 7:
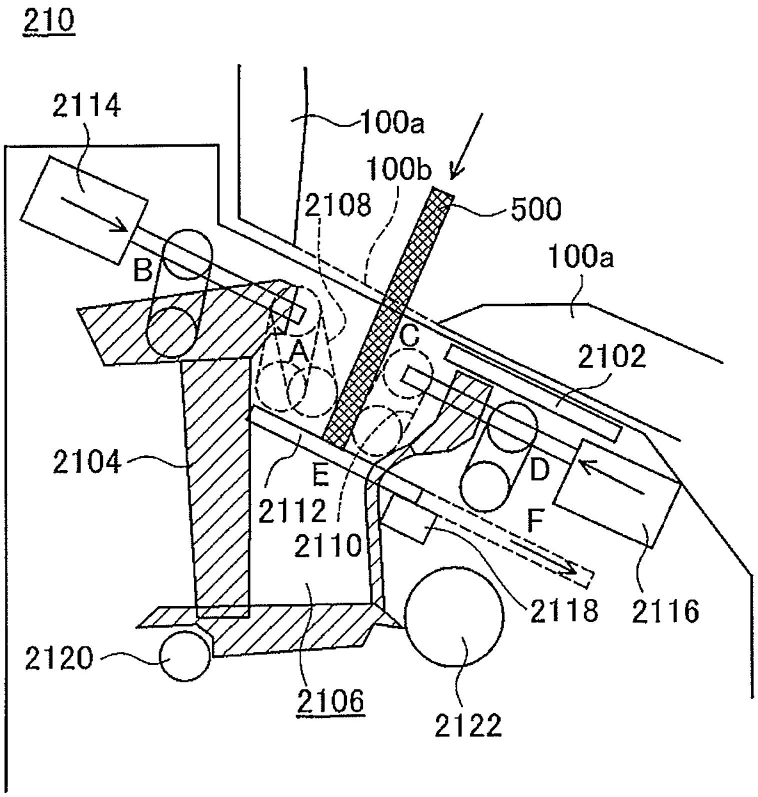
FIG. 7 is an explanatory drawing typically showing the second receiving mode.
Figure 8:
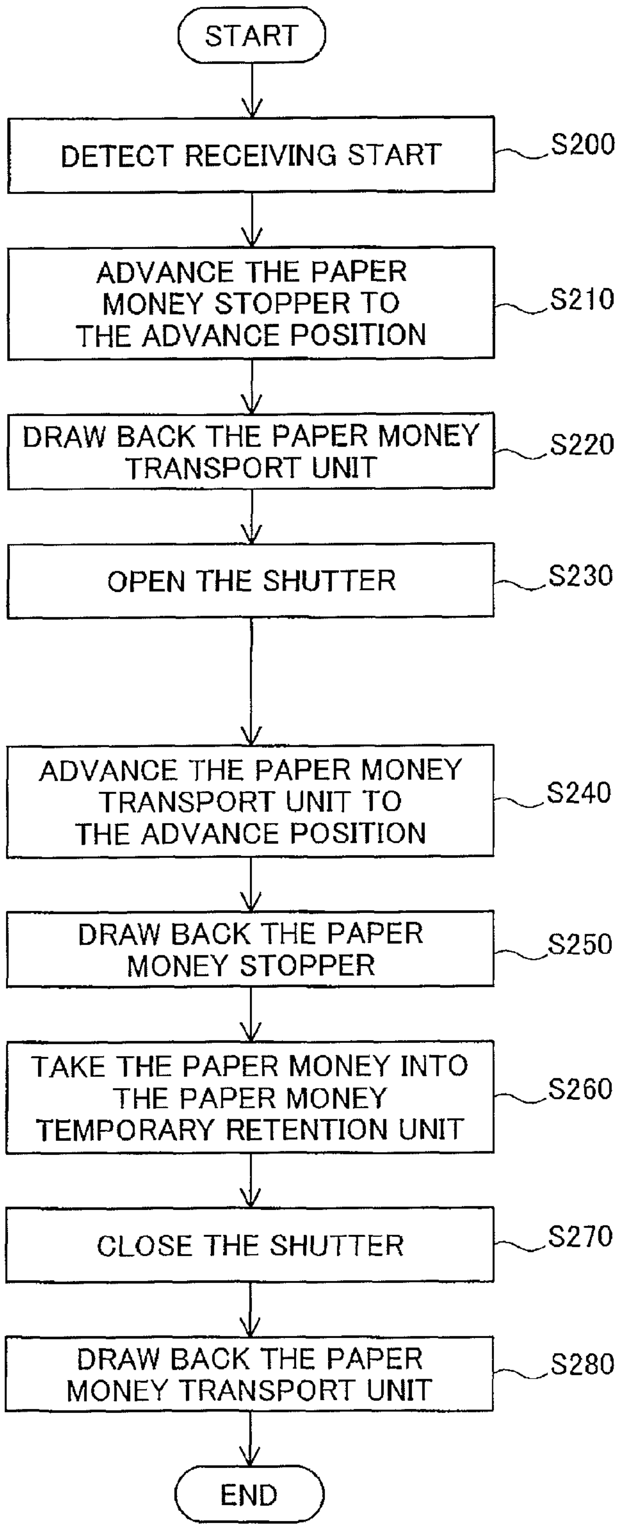
FIG. 8 is an explanatory drawing showing the operation flow chart of the second receiving mode.

The second receiving mode is described using FIG. 7 and FIG. 8. FIG. 7 is an explanatory drawing typically showing the second receiving mode. FIG. 8 is an explanatory drawing showing the operation flow chart of the second receiving mode. With the second receiving mode, the paper money receiving/dispensing mechanism 210 accepts insertion of paper money in a state with the paper money stopper 2112 advanced to the stopping position E, stops the paper money using the paper money stopper 2112 in a state for which part of the paper money appears from the paper money receiving/dispensing slot 100*b*, and after that, the first paper money transport device 2108 and the second paper money transport device 2110 are respectively advanced to the operating position A and the operating position C, and the paper money is gripped and taken into the paper money temporary retention unit 2106.

When the customer performs the depositing operation to the customer operating unit 105, the main unit controller 120 detects the receiving start (step S200). The main unit controller 120 advances the paper money stopper 2112 to the stopping position E (step S210). The main unit controller 120 causes the first moving device 2114 to draw back the first paper money transport device 2108 to the standby position B, and causes the second moving device 2116 to draw back the second paper money transport device 2110 to the standby position D (step S220). The main unit controller 120 opens the shutter 2102 (step S230), and stands by for input of the paper money from the customer.

When the paper money is inserted, the paper money stopper 2112 stops the paper money in a state with part of it appearing from the paper money receiving/dispensing slot 100*b*. The main unit controller 120 causes the first moving device 2114 to advance the first paper money transport device 2108 to the operating position A, and causes the second moving device 2116 to advance the second paper money transport device 2110 to the operating position C, and cause the first paper money transport device 2108 and the second paper money transport device 2110 to grip the paper money (step S240). At this time, the main unit controller 120 may also turn the roller 2108*b* of the first paper money transport device 2108 in the counterclockwise direction around the roller 2108*a*, and turn the roller 2110*b* of the second paper money transport device 2110 in the clockwise direction around the roller 2110*a*. The main unit controller 120 draws back the paper money stopper 2112 to the standby position F (step S250). The main unit controller 120 rotates the roller 2108*b* of the first paper money transport device 2108 in the clockwise direction, and rotates the roller 2110*b* of the second paper money transport device 2110 in the counterclockwise direction, and takes the paper money into the paper money temporary retention unit 2106. Note that the same as with the first receiving mode, the paper money temporary retention unit 2106 aligns the paper money taken into the paper money temporary retention unit 2106.

When the paper money intake is completed, the main unit controller 120 closes the shutter 2102 (step S270), stops the rotation of the roller 2108*b* of the first paper money transport device 2108 and the roller 2110*b* of the second paper money transport device 2110, and draws back the first paper money transport device 2108 and the second paper money transport device 2110 respectively to the standby position B and the standby position D (step S280).

According to the second receiving mode, the paper money receiving/dispensing mechanism 210 stops the paper money in a state with part of it appearing from the paper money receiving/dispensing slot 100*b* using the paper money stopper 2112. Therefore, it is possible to cope with to the customer's operating reference of not wanting to put their fingers in from below the paper money receiving/dispensing slot 100*b*. Also, with the paper money receiving/dispensing mechanism 210, because the paper money is gripped and taken in by the first paper money transport device 2108 and the second paper money transport device 2110, there are cases when it is possible to give the customer a real sense of the paper money being taken in and to give a sense of security according to the timing of the customer releasing the paper money.

Third Receiving Mode

Figure 9:
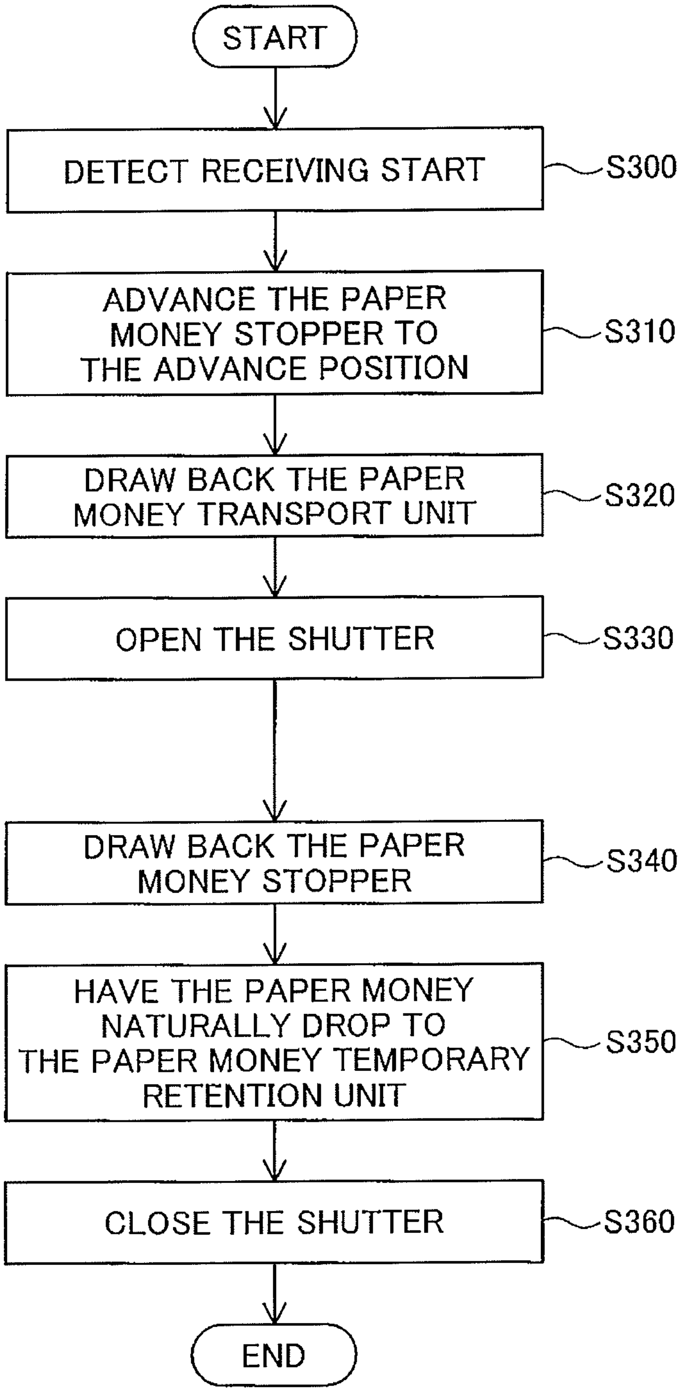
FIG. 9 is an explanatory drawing showing the operation flow chart of the third receiving mode.

We will describe the third receiving mode using FIG. 7 and FIG. 9. FIG. 9 is an explanatory drawing showing the operation flow chart of the third receiving mode. With the third receiving mode, the paper money receiving/dispensing mechanism 210 accepts insertion of paper money in a state with the paper money stopper 2112 advanced to the stopping position E, the paper money is stopped by the paper money stopper 2112 in a state with part of the paper money appearing from the paper money receiving/dispensing slot 100*b*, and after that, the paper money stopper 2112 is drawn back to the standby position F, and the paper money is taken into the paper money temporary retention unit 2106 by dropping down naturally.

With the third receiving mode, the operation until the paper money insertion is accepted (steps S300 to S330) is the same as with the second receiving mode (steps S200 to S230). Therefore, we will describe the operation thereafter.

When the paper money is inserted, the paper money stopper 2112 stops the paper money in a state with part of it appearing from the paper money receiving/dispensing slot 100*b*. The main unit controller 120 draws back the paper money stopper 2112 to the standby position F (step S340). When the paper money stopper 2112 is drawn back to the standby position F, the paper money stopped by the paper money stopper drops naturally to the paper money temporary retention unit 2106 to be taken into the paper money temporary retention unit 2106 (step S350). When the paper money intake is completed, the main unit controller 120 closes the shutter 2102 (step S360).

According to the third receiving mode, the paper money receiving/dispensing mechanism 210 has the paper money stopped by the paper money stopper 2112 in a state with part of it appearing from the paper money receiving/dispensing slot 100*b*, and after that, the paper money is taken into the paper money temporary retention unit 2106 by dropping naturally. Therefore, it is possible to cope with to the customer's operating preference of not wanting to put his fingers in from under the paper money receiving/dispensing slot 100*b*.

According to the third receiving mode, the paper money receiving/dispensing mechanism 210, when taking in paper money, does not use the first paper money transport device 2108 and the second paper money transport device 2110. Therefore, with the third receiving mode, the paper money receiving/dispensing mechanism 210 may omit the first paper money transport device 2108, the second paper money transport device 2110, the first moving device 2114, and the second moving device 2116. In this case, the step S320 in the flow chart shown in FIG. 9 is unnecessary.

Fourth Receiving Mode

Figure 10:
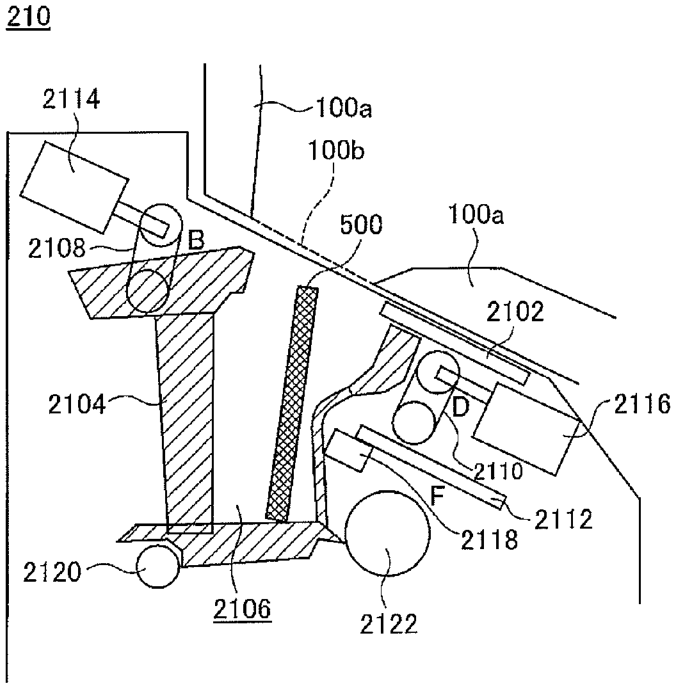
FIG. 10 is an explanatory drawing typically showing the fourth receiving mode.

We will describe the fourth receiving mode using FIG. 10. FIG. 10 is an explanatory drawing typically showing the fourth receiving mode. With the fourth receiving mode, the paper money receiving/dispensing mechanism 210 draws back the first paper money transport device 2108 and the second paper money transport device 2110 to the standby positions B and D, and in a state with the paper money stopper 2112 drawn back to the standby position F, direct insertion of the paper money is accepted at the paper money temporary retention unit 2106 and it is taken in.

When the customer performs the depositing operation on the customer operating unit 105, the main unit controller 120 detects the receiving start. The main unit controller 120 draws back the first paper money transport device 2108, the second paper money transport device 2110, and the paper money stopper 2112 respectively to the standby positions B, D, and F. The main unit controller 120 opens the shutter 2102, and stands by for direct input from the customer of the paper money to the paper money temporary retention unit 2106. When paper money is input to the paper money temporary retention unit 2106, the main unit controller 120 closes the shutter 2102.

According to the fourth receiving mode, with the paper money receiving/dispensing mechanism 210, the paper money is directly input to the paper money temporary retention unit 2106. Therefore, it is possible to give the customer a real sense of the paper money being taken and give a sense of security.

According to the fourth receiving mode, the paper money is directly input to the paper money temporary retention unit 2106, so the alignment level is higher than when gripped and transported to the first paper money transport device 2108 and the second paper money transport device 2110. As a result, when the paper money is sent out to the paper money transport path 302, skewing and jamming do not occur easily. Therefore, it is possible to improve the reliability of the ATM 10 equipped with a paper money receiving/dispensing mechanism 210.

First Dispensing Mode

Figure 11:
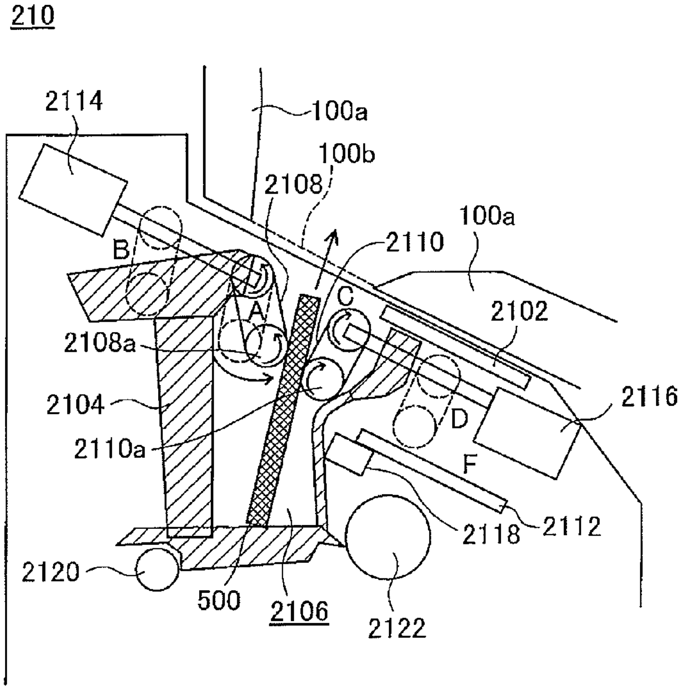
FIG. 11 is an explanatory drawing typically showing the first dispensing mode.
Figure 12:
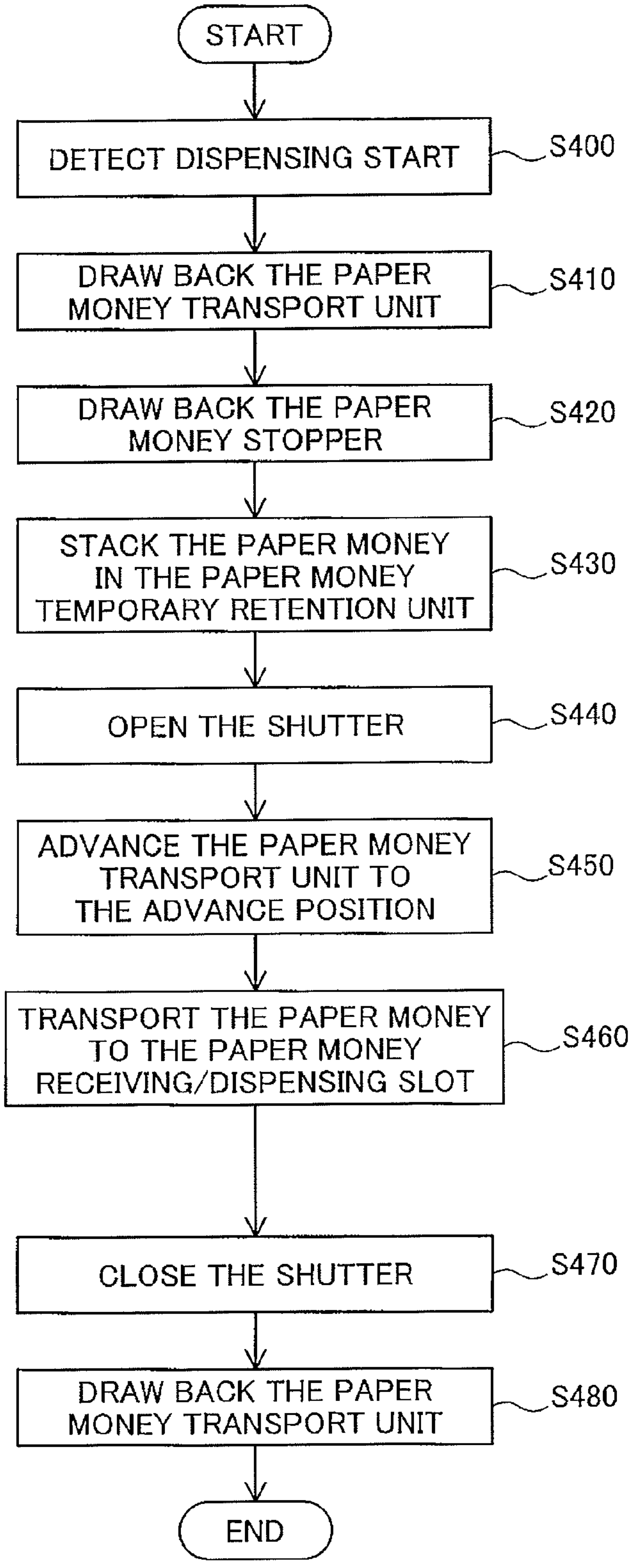
FIG. 12 is an explanatory drawing showing the operation flow chart of the first dispensing mode.

We will describe the first dispensing mode using FIG. 11 and FIG. 12. FIG. 11 is an explanatory drawing typically showing the first dispensing mode. FIG. 12 is an explanatory drawing showing the operation flow chart of the first dispensing mode.

When the customer performs the dispensing operation on the customer operating unit 105, the main unit controller 120 detects the dispensing start (step S400). The main unit controller 120 causes the first moving device 2114 to draw back the first paper money transport device 2108 to the standby position B, and causes the second moving device 2116 to draw back the second paper money transport device 2110 to the standby position D (step S410). The main unit controller 120 draws back the paper money stopper 2112 to the standby position F (step S420).

The main unit controller 120 causes the stack roller 2120 to send the paper money transported from the paper money transport path 332 to the paper money temporary retention unit 2106 (step S430). By doing this, dispensing paper moneys are accumulated in the paper money temporary retention unit 2106.

The main unit controller 120 opens the shutter 2102 (step S440). The main unit controller 120 causes the first moving device 2114 to advance the first paper money transport device 2108 to the operating position A, and causes the second moving device 2116 to advance the second paper money transport device 2110 to the operating position C, and cause the first paper money transport device 2108 and the second paper money transport device 2110 to grip the paper money (step S450). In FIG. 11, the main unit controller 120 rotates the roller 2108*b* of first paper transport device 2108 in the counterclockwise direction, rotates the roller 2110*b* of the second paper money transport device 2110 in the clockwise direction, and transports the paper money toward the paper money receiving/dispensing slot 100*b*. When the first paper money transport device 2108 and the second paper money transport device 2110 transport paper money to a state where part of the paper money appears from the paper money receiving/dispensing slot 100*b*, the main unit controller 120 stops the rotation of the roller 2108*b* of the first paper money transport device 2108 and the roller 2110*b* of the second paper money transport device 2110. The main unit controller 120 stands by for the paper money to be taken out by the customer.

When the paper money is taken out, the main unit controller 120 closes the shutter 2102 (step S470). The main unit controller 120 causes the first moving device 2114 to draw back the first paper money transport device 2108 to the standby position B, and causes the second moving device 2116 to draw back the second paper money transport device 2110 to the standby position D (step S480).

According to the first dispensing mode, during dispensing, the first paper money transport device 2108 and the second paper money transport device 2110 grip the paper money, and transport it until part of the paper money appears from the paper money receiving/dispensing slot 100*b*, so it is possible to cope with customer's operating preference when they don't want to put their fingers through the paper money receiving/dispensing slot 100*b*.

Second Dispensing Mode

We will describe the second dispensing mode. Note that the operation up to accumulation of paper moneys in the paper money temporary retention unit 2106 is the same as that of the first dispensing mode, so we will describe the operation thereafter. The main unit controller 120 opens the shutter 2102, and the dispensed paper money within the paper money temporary retention unit 2106 is taken out directly by the customer. When the paper money is taken out from the paper money temporary retention unit 2106, the main unit control unit closes the shutter 2102.

According to the second dispensing mode, when dispensing, the first paper money transport device 2108 and the second paper money transport device 2110 do not transport paper money, so paper money does not appear from the paper money receiving/dispensing slot 100*b*. Therefore, during transactions, there is little risk of having dispensed paper money being stolen from the side, and security is high.

The paper money receiving/dispensing mechanism 210 of this embodiment switches to any of the aforementioned four receiving modes for the receiving mode, and executes switching to either of the aforementioned dispensing modes for the dispensing mode. The paper money receiving/dispensing mechanism 210 is able to select the optimum mode according to demands and conditions. Note that which of the receiving modes or which of the dispensing modes is executed on the paper money receiving/dispensing mechanism 210 is set during shipping of the ATM 10, for example, but it is also possible to have the ATM 10 constituted so as to be able to change after installing of the ATM 10 as well, for example, by changing the settings from the staff operating unit 130. It is also possible to have the constitution of the ATM 10 such that selection can be done when the customer operates the customer operating unit 105 (steps S100, S200, S300, and S400).

As described above, the paper money receiving/dispensing mechanism 210 of this embodiment is constituted so as to be able to execute switching of the respective receiving modes and dispensing modes for the receiving mode and the dispensing mode, so it is possible to select the optimal mode according to demands and conditions. As a result, the operating freedom of the banking facility increases, and it is possible to increase the customer satisfaction level in response to customer wishes.

Above, we described modes of carrying out the present invention based on a number of embodiments, but the modes of carrying out the invention noted above are for easy understanding of the present invention, and do not limit the present invention. The present invention can be changed or modified without straying from the key points and the scope of the claims, and equivalent items are also of course included in the present invention.

What is claimed is:

1. A paper money receiving/dispensing mechanism, comprising:

a paper money receiving/dispensing opening configured to allow a customer to insert paper money therethrough, and to retrieve paper money dispensed therethrough;

a paper money temporary retention unit disposed under the paper money receiving/dispensing opening, and configured to temporarily retain paper money inserted through the paper money receiving/dispensing opening or to be dispensed through the paper money receiving/dispensing opening;

a paper money transport unit disposed directly above the paper money temporary retention unit, and configured to switch between a standby position and an operating position, wherein the operating position is configured to transport paper money between the paper money temporary retention unit and the paper money receiving/dispensing opening, and wherein the standby position is configured to not transport paper money; and a transport control unit configured to control the switching of the paper money transport unit between the operating position and the standby position;

a paper money stopping unit disposed above the paper money retention unit and below the paper money transport unit, and configured to switch between a standby position and a stopping position, wherein the stopping position is configured to stop the paper money between the paper money temporary retention unit and the paper money receiving/dispensing opening, wherein when in the stopping position, the paper money stopping unit is disposed such that a distance between the paper money stopping unit and the paper money receiving/dispensing opening is shorter than the length of the paper money measured in the receiving/dispensing direction; and a stopping control unit configured to control the switching of the paper money stopping unit between the stopping position and the standby position.

2. A paper money receiving/dispensing mechanism according to claim 1, wherein the transport control unit is configured to switch the paper money transport unit so as to be in the operating position during receiving of paper money; and wherein the stopping control unit is configured to switch the paper money stopping unit so as to be in the standby position during receiving of paper money.

3. A paper money receiving/dispensing mechanism according to claim 1, wherein the stopping control unit is configured to switch the paper money stopping unit so as to be in the stopping position during receiving of the paper money; and wherein when the paper money stopping unit is switched to be in the stopping position, the transport control unit is configured to switch the paper money transport unit so as to be in the operating position during receiving of the paper money.

4. A paper money receiving/dispensing mechanism according to claim 1 wherein the stopping control unit is configured to switch the paper money stopping unit so as to be in the standby position during dispensing of the paper money; and wherein the transport control unit is configured to switch the paper money transport unit so as to be in the operating position during dispensing of the paper money.

5. The paper money receiving/dispensing mechanism of claim 1, wherein the paper money temporary retention unit has a side surface and bottom formed by an inner wall of the paper money receiving/dispensing mechanism.

6. The paper money receiving/dispensing mechanism of claim 1, wherein the paper money transport unit is disposed such that a distance between the paper receiving/dispensing opening and the paper money transport unit is shorter than the length of the paper money in the insertion direction.

7. The paper money receiving/dispensing mechanism of claim 1, wherein the paper transport unit includes a first paper money transport unit and a second paper money transport unit disposed opposite to each other, and the transport control unit switches both of the first paper money transport unit and the second paper money transport unit to the operating position or the standby position.

8. The paper money receiving/dispensing mechanism of claim 1, wherein the paper money stopping unit at the stopping position sets the paper money such that a portion of the paper money extends out of the paper money receiving/dispensing opening.

9. The paper money receiving/dispensing mechanism of claim 1, wherein the paper transport unit includes a first paper money transport unit and a second paper money transport unit disposed opposite to each other;

wherein the first paper money transport unit is disposed such that a distance between the paper receiving/dispensing opening and the first paper money transport unit is shorter than the length of the paper money in the insertion direction;

wherein the second paper money transport unit is disposed such that a distance between the paper receiving/dispensing opening and the second paper money transport unit is shorter than the length of the paper money in the insertion direction; and wherein the transport control unit switches both of the first paper money transport unit and the second paper money transport unit to the operating position or the standby position.

10. The paper money receiving/dispensing mechanism of claim 1, wherein the paper transport unit includes a first paper money transport unit and a second paper money transport unit disposed opposite to each other;

wherein the first paper money transport unit is disposed such that a distance between the paper receiving/dispensing opening and the first paper money transport unit is shorter than the length of the paper money in the insertion direction;

wherein the second paper money transport unit is disposed such that a distance between the paper receiving/dispensing opening and the second paper money transport unit is shorter than the length of the paper money in the insertion direction;

wherein the transport control unit switches both of the first paper money transport unit and the second paper money transport unit to the operating position or the standby position; and wherein a location of the operating position and a location of the standby position are different.

11. The paper money receiving/dispensing mechanism of claim 1, wherein the paper transport unit includes a first paper money transport unit and a second paper money transport unit disposed opposite to each other; and wherein the transport control unit switches both of the first paper money transport unit and the second paper money transport unit to advance to a location of the operating position or to draw back a location of the standby position.

12. The paper money receiving/dispensing mechanism of claim 1, wherein the paper transport unit includes a first paper money transport unit and a second paper money transport unit disposed opposite to each other;

wherein the first paper money transport unit is disposed such that a distance between the paper receiving/dispensing opening and the first paper money transport unit is shorter than the length of the paper money in the insertion direction;

wherein the second paper money transport unit is disposed such that a distance between the paper receiving/dispensing opening and the second paper money transport unit is shorter than the length of the paper money in the insertion direction;

wherein the transport control unit switches both of the first paper money transport unit and the second paper money transport unit to the operating position or the standby position; and wherein a gap, a side of the paper money receiving/dispensing opening, between the first paper money transport unit in the operating position and the second paper money transport unit in the operating position is broader than a gap, a side of the paper money storage unit, between the first paper money transport unit in the operating position and the second paper money transport unit in the operating position.

13. A paper money receiving/dispensing mechanism, comprising:

a paper money receiving/dispensing opening configured to allow a customer to insert paper money therethrough, and to retrieve paper money dispensed therethrough;

a paper money temporary retention unit disposed under the paper money receiving/dispensing opening, and configured to temporarily retain paper money inserted through the paper money receiving/dispensing opening or to be dispensed through the paper money receiving/dispensing opening;

a paper money stopping unit disposed directly above the paper money temporary retention unit, and configured to switch between a standby position and a stopping position, wherein the stopping position is configured to stop the paper money between the paper money temporary retention unit and the paper money receiving/dispensing opening, wherein when in the stopping position, the paper money stopping unit is disposed such that a distance between the paper money stopping unit and the paper money receiving/dispensing opening is shorter than the length of the paper money measured in the receiving/dispensing direction; and a stopping control unit configured to switch the paper money stopping unit between the standby position and the stopping position.

14. The paper money receiving/dispensing mechanism of claim 13, wherein the paper money temporary retention unit has a side surface and bottom formed by an inner wall of the paper money receiving/dispensing mechanism.

15. The paper money receiving/dispensing mechanism of claim 13, wherein the paper money stopping unit at the stopping position sets the paper money such that a portion of the paper money extends out of the paper money receiving/dispensing opening.

16. An automatic teller machine, comprising:

a paper money receiving/dispensing mechanism according to any of claims 1, 2, 3, 4, 13, 5 and 14.

* * * * *